United States Patent [19]
Hossain et al.

[11] Patent Number: 5,075,017
[45] Date of Patent: Dec. 24, 1991

[54] METHOD FOR REMOVING POLYCHLORINATED DIBENZODIOXINS AND POLYCHLORINATED DIBENZOFURANS FROM PAPER MILL SLUDGE

[75] Inventors: Shafi U. Hossain, Menasha, Wis.; Carol A. Blaney, Roswell, Ga.

[73] Assignee: Kimberly-Clark Corporation, Neenah, Wis.

[21] Appl. No.: 596,810

[22] Filed: Oct. 12, 1990

[51] Int. Cl.$^5$ ............................................. C02F 11/08
[52] U.S. Cl. .................................. 210/761; 210/909; 210/928
[58] Field of Search ................ 210/761, 762, 909, 928

[56] References Cited

U.S. PATENT DOCUMENTS

| | | | |
|---|---|---|---|
| 3,876,497 | 4/1975 | Hoffman | 210/928 |
| 4,061,566 | 12/1977 | Modell | 210/32 |
| 4,113,446 | 9/1978 | Modell et al. | 48/202 |
| 4,147,624 | 4/1979 | Modell | 210/32 |
| 4,263,253 | 4/1981 | Pilz et al. | 422/1 |
| 4,308,200 | 12/1981 | Fremont | 260/110 |
| 4,338,199 | 7/1982 | Modell | 210/721 |
| 4,466,923 | 8/1984 | Friedrich | 260/412.4 |
| 4,472,442 | 9/1984 | Katz | 426/428 |
| 4,493,797 | 1/1985 | Avedesian | 530/507 |
| 4,495,095 | 1/1985 | Lawson et al. | 260/97.7 |
| 4,543,190 | 9/1985 | Modell | 210/761 |
| 4,550,198 | 10/1985 | Myerson | 560/486 |
| 4,554,170 | 11/1985 | Panzner et al. | 426/651 |
| 4,564,458 | 1/1986 | Burleson | 210/747 |
| 4,594,164 | 6/1986 | Titmas | 210/741 |
| 4,647,466 | 3/1987 | Japikse et al. | 426/387 |
| 4,675,198 | 6/1987 | Sevenants | 426/425 |
| 4,703,060 | 10/1987 | Traitler et al. | 514/549 |
| 4,728,525 | 3/1988 | Toro et al. | 426/481 |
| 4,767,634 | 8/1988 | Kaleda et al. | 426/271 |
| 4,964,995 | 10/1990 | Chum et al. | 210/928 |
| 5,009,745 | 4/1991 | Hossain | 162/5 |

FOREIGN PATENT DOCUMENTS

| | | |
|---|---|---|
| 314223 | 5/1989 | European Pat. Off. |
| 81/00854 | 4/1981 | World Int. Prop. O. |
| 81/00855 | 4/1981 | World Int. Prop. O. |

OTHER PUBLICATIONS

"Incineration Disposal Methods", M. P. Esposito, T. O. Tiernan and F. E. Dryden, Dioxins, pp. 258–259, Nov. 1980.

"Destruction of Dioxin-Containing Wastes in a Mobile Incineration System", R. D. Kleopfer et al., Chlorinated Dioxins and Dibenzofurans in Perspective, Chapter 34, pp. 511–518.

"Levels of Chlorinated Organics in a Municipal Incinerator", R. R. E. Clement et al., Chlorinated Dioxins and Dibenzofurans in The Total Environment II, Chapter 34, pp. 489–514.

"Production of Chlorinated Aromatics in the Post-Combustion Zone and Soiler", T. Oberg et al., Chemosphere, vol. 19, Nos. 1–6, pp. 317–322, 1989.

Botre et al., *Environmental Science and Technol.*, vol. 12, No. 3, Mar. 1978, pp. 335–336.

Brady et al., "Supercritical Extraction of Toxic Organics from Soils", *Ind. Eng. Chem. Res.*, 1987, vol. 26, pp. 261–268.

Crosby et al., *Environmental Health Perspectives*, Sept. 1973, pp. 259–266.

Crosby et al., *Science*, vol. 173, Aug. 20, 1971, pp. 173–174.

Dooley et al., *EPA Report No. 600/9-87/018F*, pp. 383–397.

Dulin et al., *Environ. Sci. Technol.*, vol. 20, No. 1, 1986, pp. 72–77.

(List continued on next page.)

*Primary Examiner*—Thomas Wyse
*Attorney, Agent, or Firm*—William D. Herrick

[57] ABSTRACT

A process for removing PCDD's and PCDF's from paper mill sludge is provided. The process comprises combining the sludge with an oxidant and then oxidizing the sludge under supercritical or near supercritical conditions to destroy the PCDD's and PCDF's. Using this process, destruction efficiencies of greater than 98% have been achieved for 2,3,7,8-TCDD, which is reportedly the most toxic of the dioxins.

14 Claims, 4 Drawing Sheets

OTHER PUBLICATIONS

Eckert et al., *Environ. Sci. Technol.*, 1986, vol. 20, pp. 319-325.

Exner et al., *Chlorinated Dioxins and Dibenzofurans in the Total Environment II*, Keith et al. eds, Butterworth, 1985, pp. 48-49.

Groves et al., *CRC Critical Reviews in Environmental Control*, 1985, vol. 15, pp. 237-274.

Hatakeda et al., *Nipon Kagaku Kaishi*, 1987, No. 5, pp. 931-933.

Hawthorne et al., *J. Chromatogr.*, 1987, vol. 403, pp. 63-76.

Hawthorne et al., *Anal. Chem.*, 1987, vol. 59, pp. 1705-1708.

Li et al., *Ind. Eng. Chem. Res.*, 1988, vol. 27, pp. 1301-1312.

Modell, M., *Fundam. Thermochem. Biomass Convers.*, 1985, pp. 95-119.

Ottoboni, A., *The Dose Makes the Poison*, Vincente Books, Berkeley, Ca., 1984.

Pang et al., *Ind. Eng. Chem. Process. Des. Dev.*, 1985, vol. 24, pp. 1027-1032.

Plimmer, J. R., *Bull. Environm. Contam. Toxicol.*, vol. 20, 1978, pp. 87-92.

West et al., *Can. J. Chem. Eng.*, 1987, vol. 65, pp. 645-650.

*Chemosphere—Chlorinated Dioxins and Related Compounds* 1987, McNelis et al. eds., Pergamon Press, New York, vol. 18, Nos. 1-6, 1989, p. 50.

*Dioxins*, NTIS Report No. PB82-136847, Industrial Environmental Research Laboratory, Cincinnati, Oh., Nov. 1980, Section 6.

Suprex Publication No. TN-022, Suprex Corporation, Pittsburgh, Pa., 1989.

Podoll et al., *Environ. Sci. Technol.*, vol. 20, No. 5, 1986, pp. 490-492.

Rappe et al., *Chlorinated Dioxins and Dibenzofurans in the Total Environment II*, Keith et al. eds., Butterworth, 1985, pp. 125-126.

Ritter and Campbell, *Biotechnology and Bioengineering Symp.*, 1986, No. 17, pp. 179-182.

Schneiderman et al., *J. Chromatogr.*, 1987, vol. 409, pp. 343-353.

Shishikura et al., *J. Jpn. Oil Chem. Soc.*, 1988, vol. 37, pp. 8-12.

Srinivasan et al., *Chlorinated Dioxins and Dibenzofurans in Perspective*, Rappe et al. eds., Lewis Publishers, Inc., 1986, pp. 531-537.

METHOD FOR REMOVING POLYCHLORINATED DIBENZODIOXINS AND POLYCHLORINATED DIBENZOFURANS FROM PAPER MILL SLUDGE

BACKGROUND OF THE INVENTION

The present invention relates to the removal of polychlorinated dibenzo-p-dioxins, (referred to hereinafter as "PCDD's" or simply "dioxins"), and polychlorinated dibenzofurans, (referred to hereinafter as "PCDF's") from paper mill sludge by supercritical water oxidation.

As used herein, paper mill sludge refers to that portion of the papermaking process waste stream that contains 1) fibrous fines and debris composed of carbohydrates such as celluloses and hemicelluloses, 2) inorganic materials such as aluminum silicates (clays), fillers, coatings, and the like, and 3) small amounts of residual pulping chemicals. Such sludges can include tissue mill sludge, pulp mill sludge, sludge from the de-inking of secondary fibers, and the like.

Efficient management of solid waste streams, of which industrial wastes such as paper mill sludge constitute a significant part, has become an important societal theme. Until recently, landfilling has been the disposal method of choice for solid wastes such as paper mill sludge due to economic appeal. However, recent legislative trends indicate that in the future landfills may become harder to obtain and less economical to maintain. Increased attention has thus begun to be placed on alternative methods of waste disposal such as recycling, incineration, and waste reduction at the source.

In the case of paper mill sludge disposal, conventional incineration is in general a feasible alternative to landfilling. However, in recent years, a number of concerns have arisen about the incineration process as applied to this type of sludge.

These concerns relate to the presence of small quantities of reportedly toxic compounds, specifically, PCDD's and PCDF's, in paper mill sludge. It has been reported in the literature that conventional incineration may not always destroy these chloro-organic compounds and, in fact, under certain circumstances, incineration can generate more of these compounds unless expensive after-burners are used. (See *Chlorinated Dioxins and Dibenzofurans in the Total Environment II*, Keith, L. H., Rappe, C. and Choudhary, G., eds., Butterworth Publishers, Boston, Massachusetts, 1985, pages 48–49.) Moreover, even when after-burners are used, cold spots in the burners sometimes occur inadvertently, resulting in discharges of PCDD's and PCDF's into the atmosphere.

Kraft pulps, when bleached with sequences including an elemental chlorine stage, sometimes contain small but detectable levels of PCDD's and PCDF's. Recycled, bleached Kraft fibers under a variety of guises (e.g., coated paper, ledger paper, etc.) are often present in substantial quantities in waste paper stock as purchased from commercial dealers. Hence waste paper stock, intended for recycling, i.e., the production of secondary fibers, may contain small but detectable amounts of PCDD's and PCDF's.

The processing steps currently used to treat recycled waste paper (e.g., pulping/screening/flotation/bleaching) are not effective in removing PCDD's and PCDF's from stock containing chlorine-bleached fibers. Therefore, paper mill sludges generated from the secondary fiber industry, and from any pulping process (e.g. Kraft) which utilizes one or more elemental chlorine bleaching stages, may contain PCDD's and PCDF's.

PCDD's and PCDF's are large groups of chloro-organic compounds which have become ubiquitous in industrial societies. The structures of these compounds are as follows, where in each case $x+y=1-8$:

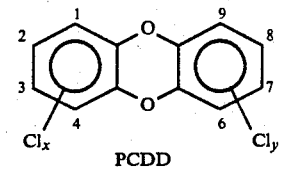
PCDD

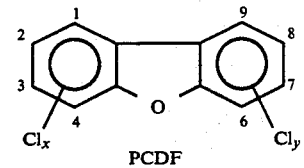
PCDF

Of the various possible isomers of these compounds, the following are reportedly the most toxic:
2,3,7,8-tetrachlorodibenzo-p-dioxin (TCDD)
1,2,3,7,8-pentachlorodibenzo-p-dioxin (PCDD)
2,3,7,8-tetrachlorodibenzofuran (TCDF)
1,2,3,7,8-pentachlorodibenzofuran (PCDF)
2,3,4,7,8-pentachlorodibenzofuran (PCDF).

Also reported to be highly toxic are:
1,2,3,6,7,8-hexachlorodibenzo-p-dioxin (HCDD)
1,2,3,7,8,9-hexachlorodibenzo-p-dioxin (HCDD)
1,2,3,4,7,8-hexachlorodibenzo-p-dioxin (HCDD)
1,2,3,6,7,8-hexachlorodibenzofuran (HCDF)
1,2,3,7,8,9-hexachlorodibenzofuran (HCDF)
1,2,3,4,7,8-hexachlorodibenzofuran (HCDF)
2,3,4,6,7,8-hexachlorodibenzofuran (HCDF)
See Rappe et al., "Analysis of Polychlorinated Dibenzofurans and Dioxins in Ecological Samples," in *Chlorinated Dioxins and Dibenzofurans in the Total Environment II*, Keith, L. H., Rappe, C. and Choudhary, G., eds., Butterworth Publishers, Boston, Massachusetts, 1985, pages 125–126.

In the recent past, the issue of health hazards associated with PCDD's and PCDF's has received much attention in the news media. PCDD's and PCDF's are known to cause a temporary form of a skin ailment known as "chlor-acne." Also, PCDD's and PCDF's (particularly 2,3,7,8-TCDD) have proved to be extremely toxic to certain animals in laboratory studies, in particular to guinea pigs ($LD_{50}=0.6-4.0$ micrograms/kilogram). See, for example, Ottoboni, A., *The Dose Makes the Poison*, Vincente Books, Berkeley, California, 1984, and Dioxins, NTIS Report No. PB82-136847, Industrial Environmental Research Laboratory, Cincinnati, Ohio, November, 1980, Section 6.

Because of this reported high level of toxicity to a common laboratory test animal (i.e., the guinea pig), there is a general concern as to the long-term effects of PCDD's and PCDF's on human physiology. Accordingly, there is an important need to remove or substantially reduce the content of PCDD's and PCDF's from paper mill sludge as part of the disposal process. It is an object of the present invention to respond to this need.

Some references exist in the literature regarding attempts to decompose or destroy dioxins in a state of solution in liquid media (e.g., hexane) or in substances such as silica gel or clay via photolytic techniques, e.g., UV radiation. (See Ottoboni, supra; Crosby, D.G., et al., *Science*, Vol. 173, Aug. 20, 1971, pages 173-174; Plimmer, J. R., *Bull. Environm. Contam. Toxicol.*, Vol. 20, 1978, pages 87-92; Botre, Claudio, Adriana Memoil, and Franco Alhaique, *Environmental Science and Technol.*, Vol. 12, No. 3, March 1978, pages 335-336; Crosby, D. G., et. al., *Environmental Health Perspectives*, Sept. 1973, pages 259-266; Dulin, David, Howard Drossman, and Theodore Mill, *Environ. Sci. Technol.*, Vol. 20, No. 1, 1986, pages 72-77; and Podoll, R. Thomas, Helen M. Jaber, and Theodore Mill, *Environ. Sci. Technol.*, Vol. 20, No. 5, 1986, pages 490-492.)

The process has been shown to work to an extent but appears to be highly dependent upon the presence of a hydrogen donor solvent, the type and level of impurities present, and the substrate. Furthermore, the photoproduct resulting from irradiation of 2,3,7,8-TCDD has been reported to be trichloro- and dichloro-benzo-p-dioxins, which are less toxic than 2,3,7,8-TCDD but, nevertheless, are undesirable. No attempt has been made to explore the potential of the photolytic technique of destroying PCDD's and PCDF's in cellulosic materials such as paper mill sludge U.S. Pat. Nos. 4,338,199 and 4,543,190 to Modell describe a process in which organic materials are oxidized in supercritical water. The '199 patent includes a general statement that its process can be used to remove toxic chemicals from the wastes generated by a variety of industries including forest product wastes and paper and pulp mill wastes. No specific mention is made of dioxins. The '190 patent describes the treatment of various chlorinated organics other than dioxins with supercritical water and states that conversion of these materials to chlorinated dibenzo-p-dioxins was not observed (see Example 6).

Although both patents mention paper mill sludge as one of the materials which can be used in the supercritical water process, neither patent discloses work actually done on this type of sludge. In particular, neither patent discloses or suggests that supercritical water oxidation can remove PCDD's and PCDF's from paper mill sludge.

The use of supercritical water to treat organic waste materials is also disclosed in PCT Patent Publication No. WO 81/00854, Modell et al., U.S. Pat. No. 4,113,446, Burleson, U.S. Pat. No. 4,564,458, and Titmas, U.S. Pat. No. 4,594,164. The treatment of wood chips and black liquor from pulping with supercritical water or near supercritical water is described in Modell, PCT Patent Publication No. WO 81/00855. See also Modell, M., "Gasification and Liquefaction of Forest Products in Supercritical Water", *Fundam. Thermochem. Biomass Convers.*, 1985, pp. 95-119; and West et al., "Pyrolysis of 1,3-butanediol as a model reaction for wood liquefaction in supercritical water", *Can. J. Chem. Eng.*, 1987, vol. 65, pp. 645-650.

A summary of experiments performed by Modar, Inc., using the Modell supercritical water process was published in *Chemosphere—Chlorinated Dioxins and Related Compounds* 1987, McNelis et al., editors, Pergamon Press, New York, Vol. 18, Nos. 1-6, 1989, page 50. As described therein, bench-scale tests were performed on soils and liquid wastes contaminated with chlorobenzenes and PCDDs. Supercritical water oxidation was found to remove 2,3,7,8-TCDD and chlorobenzenes from soil and to remove 2,3,7,8-TCDD, TCDD's and OCDD from liquid wastes.

In considering the Modell work with super-critical water, it is important to keep in mind the differences between different types of wastes and the properties of PCDD's and PCDF's. In particular, supercritical water experiments performed on municipal wastes, specifically, municipal sludge, cannot be used to predict whether or not PCDD's and PCDF's can be oxidized under supercritical conditions in paper mill sludge.

This is so because of the difference in composition of municipal sludge and paper mill sludge. Thus, paper mill sludge contains lime mud, clay, fillers, relatively large amounts of cellulose fibers, and relatively low amounts of grease and fats. Additionally, municipal sludge contains substantial amounts (up to about 40%) of proteins. Also, compounds of potassium and phosphorous are often present in significant quantities in municipal sludges, whereas paper mill sludges, in general, contain much smaller amounts of such compounds.

These compositional differences make predictions from one type of sludge to another unreliable especially when the binding properties of PCDD's and PCDF's are taken into account. Thus, as known in the art, high surface area materials, such as cellulose fibers and/or clay, are capable of strongly binding organic compounds such as PCDD's and PCDF's. See Srinivasan et al., "Binding of OCDD, 2,3,7,8-TCDD and HCB to Clay-Based Sorbents," in *Chlorinated Dioxins and Dibenzofurans in Perspective*, Rappe, C., Choudhary, G., and Keith, L. H., eds., Lewis Publishers, Inc., Chelsea, Michigan, 1986, page 532.

Moreover, in a water system, PCDD's and PCDF's will adhere to solid sorbents rather than remaining free in solution. Thus, partition coefficients in the range of $2.8-67.1 \times 10^3$ have been reported for 2,3,7,8-TCDD for a variety of sorbents including hydroxy aluminum-clay and activated carbon. This compound also adheres quite well to glass in a water environment. See Srinivasan et al., supra at pages 531-537.

These binding properties in combination with the fiber, mud and filler composition of paper mill sludge makes the effective removal of PCDD's and PCDF's from this type of sludge particularly difficult to achieve. It is to this challenge that the present invention is directed.

In addition to the foregoing specific references, a general review of the use of supercritical fluids in various industrial and pollution control processes can be found in Eckert et al., "Supercritical fluid processing", *Environ. Sci. Technol.*, 1986, vol. 20, pp. 319-325. Among other things, these authors discuss a study in which supercritical ethylene was used to remove trichlorophenol from from soil as a model for the removal of dioxins and polychlorinated biphenyls (PCBs). No data are presented for dioxins.

Along these same lines, Pang et al., "Supercritical Extraction of Aromatic Hydrocarbon Solids and Tar and Bitumens", *Ind. Eng. Chem. Process. Des. Dev.*, 1985, vol. 24, pp. 1027-1032 discuss the use of various supercritical fluids to extract organic materials from tar sands. The reference mentions the possibility of using supercritical extraction to remove hazardous materials such as PCBs and dioxin from soils.

Other studies involving the use of supercritical fluids to remove hazardous organic materials from environmental solids such as soil can be found in Groves et al. "State-of-the-art on the supercritical extraction of organics from hazardous wastes", *CRC Critical Reviews in Environmental Control*, 1985, vol. 15, pp. 237-274; Hawthorne et al., "Extraction and Recovery of Polycyclic Aromatic Hydrocarbons from Environmental Solids Using Supercritical Fluids", *Anal. Chem.*, 1987, vol. 59, pp. 1705-1708; Dooley et al., "Supercritical Fluid Extraction and Catalytic Oxidation of Toxic Organics from Soils", *EPA Report No. 600/9-87/018F*, pp. 383-397; and Brady et al. "Supercritical Extraction of Toxic Organics from Soils", *Ind. Eng. Chem. Res.*, 1987, vol. 26, pp. 261-268.

Various uses of supercritical fluids in the processing of materials have been disclosed in the literature. For example, supercritical carbon dioxide has been used to remove tall oil and turpentine from coniferous woods in Fremont, U.S. Pat. No. 4,308,200, to extract lignin from the black liquor produced by the Kraft process for pulp production in Avedesian, U.S. Pat. No. 4,493,797, to treat refinery sludges in European Patent Publication No. 314,223, to regenerate absorbents used in waste water treatment systems in Modell, U.S. Pat. Nos. 4,061,566 and 4,147,624, to sterilize pharmaceuticals in Pilz et al., U.S. Pat. No. 4,263,253, to remove off-flavor materials from textured vegetable products in Sevenants, U.S. Pat. No. 4,675,198, to remove gamma-linolenic acid from fruit seeds in Traitler et al., U.S. Pat. No. 4,703,060, and to decaffeinate coffee in Katz, U.S. Pat. No. 4,472,442; Toro et al., U.S. Pat. No. 4,728,525 and Kaleda et al., U.S. Pat. No. 4,767,634. See also, Friedrich, U.S. Pat. No. 4,466,923; Lawson et al., U.S. Pat. No. 4,495,095; Myerson, U.S. Pat. No. 4,550,198; Panzner et al., U.S. Pat. No. 4,554,170; Japikse et al., U.S. Pat. No. 4,647,466; Ritter and Campbell, "The Effects of Supercritical Carbon Dioxide Extraction on Pine Wood Structure", *Biotechnology and Bioengineering Symp.*, 1986, no. 17, pp. 179-182; Hatakeda et al., "Extraction of Sugi (Cryptomeria japonica D. Don) with supercritical carbon dioxide", *Nipon Kagaku Kaishi*, 1987, no. 5, pp. 931-933; Shishikura et al., "Concentration of Tocopherols from Soybean Sludge by Supercritical Fluid Extraction", *J. Jpn. Oil Chem. Soc.*, 1988, vol. 37, pp. 8-12; and Li and Kiran "Interaction of Supercritical Fluids with Lignocellulosic Materials", *Ind. Eng. Chem. Res.*, 1988, vol. 27, pp. 1301-1312.

In addition to their use in waste treatment and materials processing, supercritical fluids have been used in connection with various analytic procedures. For example, Suprex Publication No. TN-022, Suprex Corporation, Pittsburgh, PA, 1989, mentions the use of supercritical carbon dioxide as part of an analytical procedure for assaying dioxins. Similarly, Hawthorne et al., "Directly coupled supercritical fluid extraction-gas chromatographic analysis of polycyclic aromatic hydrocarbons and polychlorinated biphenyls from environmental solids", *J. Chromatogr.*, 1987, vol. 403, pp. 63-76, discuss the use of supercritical fluid extraction coupled to a gas chromatograph to analyze environmental solids, e.g., urban dust, for organic pollutants, specifically, polycyclic aromatic hydrocarbons. The extraction was performed using nitrous oxide as the supercritical fluid. Along similar lines, Schneiderman et al., "Determination of anthraquinone in paper and wood using supercritical fluid extraction and high-performance liquid chromatography with electrochemical detection", *J. Chromatogr.*, 1987, vol. 409, pp. 343-353, describe the combination of supercritical fluid extraction using carbon dioxide, high-performance liquid chromatography, and electrochemical detection to analyze Kraft paper and pine plywood sawdust for anthraquinone.

Significantly, none of these references in any way discloses or suggests that PCDD's and PCDF's can be effectively removed from paper mill sludge via oxidation with supercritical water.

SUMMARY OF THE INVENTION

In view of the foregoing state of the art, it is an object of the present invention to provide a method for removing PCDD's and PCDF's from paper mill sludge. More particularly, it is an object of the invention to provide a method for oxidizing at least about 90% and preferably at least about 95% of the PCDD's and PCDF's in paper mill sludge. It is a specific object of the invention to remove one or more of the following PCDD and PCDF isomers from such sludge:

2,3,7,8-tetrachlorodibenzo-p-dioxin
1,2,3,7,8-pentachlorodibenzo-p-dioxin
2,3,7,8-tetrachlorodibenzofuran
1,2,3,7,8-pentachlorodibenzofuran
2,3,4,7,8-pentachlorodibenzofuran
1,2,3,6,7,8-hexachlorodibenzo-p-dioxin
1,2,3,7,8,9-hexachlorodibenzo-p-dioxin
1,2,3,4,7,8-hexachlorodibenzo-p-dioxin
1,2,3,6,7,8-hexachlorodibenzofuran
1,2,3,7,8,9-hexachlorodibenzofuran
1,2,3,4,7,8-hexachlorodibenzofuran
2,3,4,6,7,8-hexachlorodibenzofuran.

It is a further object of the invention to provide a method for removing PCDD's and PCDF's from paper mill sludge which is cost-effective and relatively simple to perform.

To achieve the foregoing and other objects, the invention provides a method for oxidizing PCDD's and/or PCDF's in a waste product which contains water and cellulose fiber and which may contain clay and/or fillers, e.g., paper mill sludge, which comprises the steps of:

(a) if necessary, adjusting the water content of the waste product to allow mixing and pumping of the product;

(b) combining the water-containing waste product with an oxidant; and (c) subjecting the combination of the water-containing waste product and the oxidant to supercritical or near supercritical conditions for a period of time sufficient to oxidize at least about 90 percent of the PCDD's and/or PCDF's in the waste product.

Preferably, the waste product is macerated prior to step (b). The maceration can be performed using various types of conventional macerators, and should be continued until the waste product reaches a pumpable consistency.

The oxidant used in step (b) is preferably $O_2$ gas, although other oxidants, such as hydrogen peroxide, can be used if desired. Also, mixtures of oxidants, as well as mixtures of oxidants with inert ingredients (e.g., inert gases, carriers, and the like), can be used. Although pressurized $O_2$ gas is preferred, pressurized air can also be used as the source of the oxidant. In general, the amount of oxidant provided should be in substantial excess over the stoichiometric amount required for complete oxidation of the waste product.

The pressures used during the oxidation should be above about 217 atmospheres (3189 psia), preferably from about 217 atmospheres to about 500 atmospheres (7348 psia), and most preferably from about 250 atmospheres to about 410 atmospheres. The temperatures should be above about 374° C., preferably from about 374° C. to about 750° C., and most preferably from about 400° C. to about 650° C. The water-containing waste product/oxidant mixture should be maintained under supercritical or near supercritical conditions for a period of time of at least about 5 seconds, preferably at least about 10 seconds. These ranges, of course, may vary depending upon the particular equipment used to perform the oxidation and the particular characteristics of the cellulose-containing waste product being treated. The specific parameters for any particular application can be readily determined by persons skilled in the art from the disclosure herein.

As demonstrated by the experimental data presented below, using processing conditions within the foregoing ranges, greater than 98% oxidation was achieved for 2,3,7,8-TCDD, reportedly the most toxic of all of the PCDD's and PCDF's. In view of the high thermal stability of PCDD's as reported by J. H. Exner et al in Section I, Part 4 of *Chlorinated Dioxins and Dibenzofurans in the Total Environment II*, Keith, L. H., Rappe C. and Choudhary, G., eds., Butterworth Publishers, Boston, Massachusetts, 1985, the 98% oxidation level is considered to be unexpectedly high.

The accompanying drawings, which are incorporated in and constitute part of the specification, illustrate a preferred embodiment of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

As discussed above, the present invention relates to the oxidation of PCDD's and PCDF's in waste products which contain cellulose fibers and may contain clays, fillers, coatings, residual pulping chemicals, and the like. In particular, the invention relates to the oxidation of PCDD's and PCDF's in paper mill sludges. Typically, the material being treated will include at least some cellulose fiber which at some point was processed using a chlorine bleaching step and may at least some PCDD's and PCDF's.

As part of the treatment, the water content of the waste product is preferably adjusted so as to be in the range of from about 80 to about 99 percent by weight. The oxidation is performed under conditions wherein the water in the mixture is in a supercritical or near supercritical state.

Figure 1:
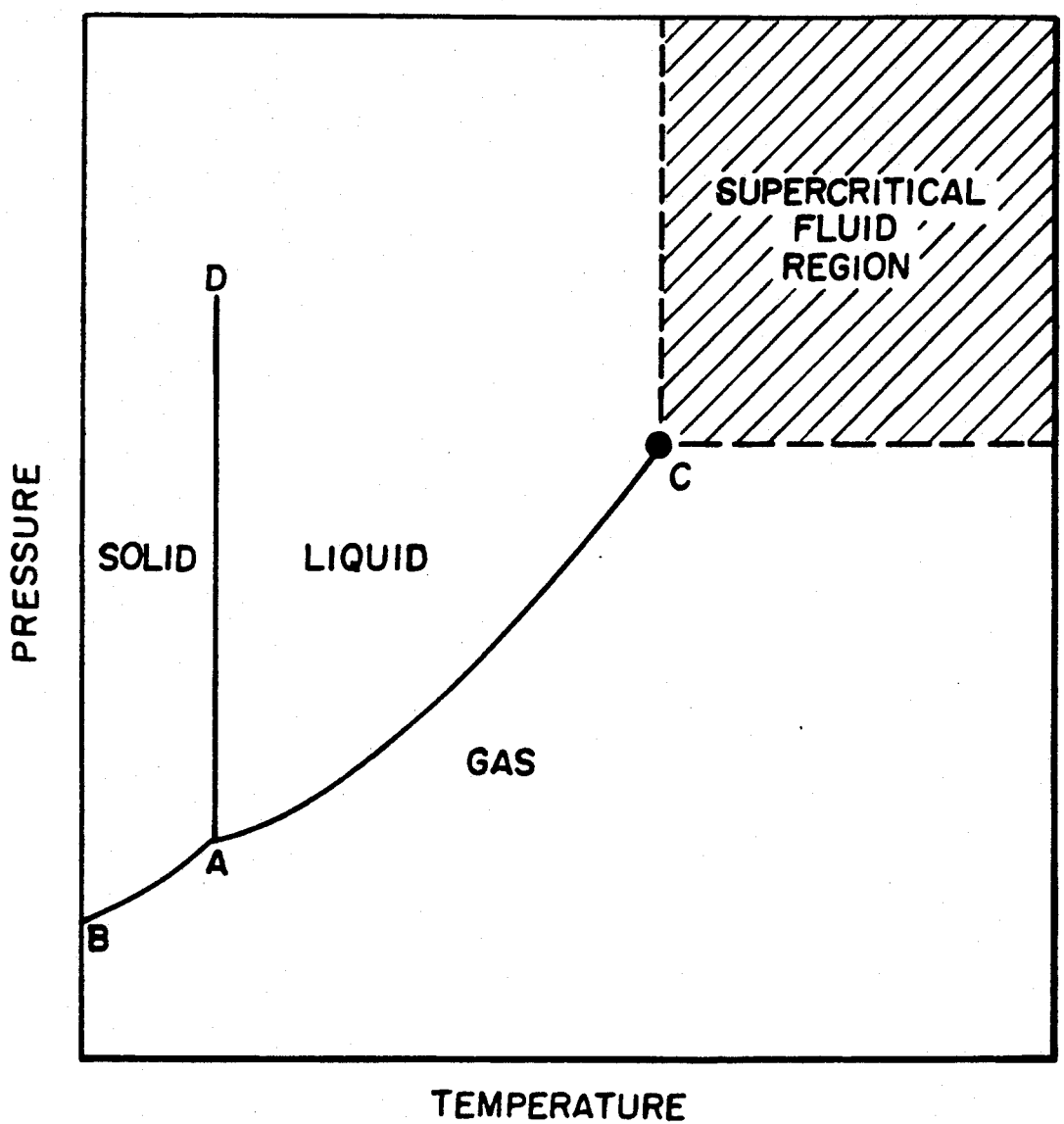
FIG. 1 is a pressure-temperature diagram illustrating water's supercritical fluid region.

The three commonly encountered states or phases of matter are solid, liquid, and gas. Depending upon the ambient conditions (e.g., pressure/temperature), the three phases can exist singly or in equilibrium with other phases. The phase diagram of FIG. 1 illustrates the relationship between these phases for a pure substance, i.e., for pure water. The curves AB, AC, and AD represent the boundaries separating single phases. These curves are known as "coexistence curves" since the phases exist in equilibrium along these curves. Specifically, curve AB is the solid/gas equilibrium curve, curve AC is the liquid/gas equilibrium curve, and curve AD is the solid/liquid equilibrium curve. For simplicity, the curves are often termed the sublimation, vapor pressure, and melting curves.

Point A of FIG. 1 is known as the triple point where all three phases coexist in equilibrium. Point C, the end point of the vapor pressure curve, is known as the gas-liquid critical point where the distinction between gas and liquid disappears. The temperature and the pressure at the critical point are known as the critical temperature ($T_c$) and the critical pressure ($P_c$). No gas can be liquefied above its $T_c$, no matter how great the pressure. The shaded region in FIG. 1 is known as the supercritical fluid state, and a substance existing in that region (i.e., a substance which has been heated above its $T_c$ and compressed beyond its $P_c$) is termed a supercritical fluid (SCF).

In the supercritical state, substances behave partly as a gas and partly as a liquid. Their densities are liquid-like but in respect of diffusivity or penetration capability they resemble gases. The density of a supercritical fluid may be continuously changed without phase separation by changes in pressure and/or temperature. Density dependent properties such as solvent power also undergo corresponding changes. For example, when water is in the supercritical state, it tends to lose its hydrogen-bonding characteristics, its dielectric constant tends to suffer a dramatic decline, and it tends to become miscible with certain hydrocarbons such as benzene.

As discussed above, the present invention uses supercritical or near supercritical water to aid in the oxidation of PCDD's and PCDF's in paper mill sludges. The critical temperature and pressure for pure water are 374° C. and 217 atmospheres, respectively. Of course, as used in the present invention, water is not operating in a simple, pure state, but as part of a multi-component system. It is possible, therefore, that depending upon the particular system, the advantages of the invention can be achieved even though the pressures and/or the temperatures used are not above the critical values for pure water. It is in this sense that the phrase "near supercritical" is used herein.

Figure 2:
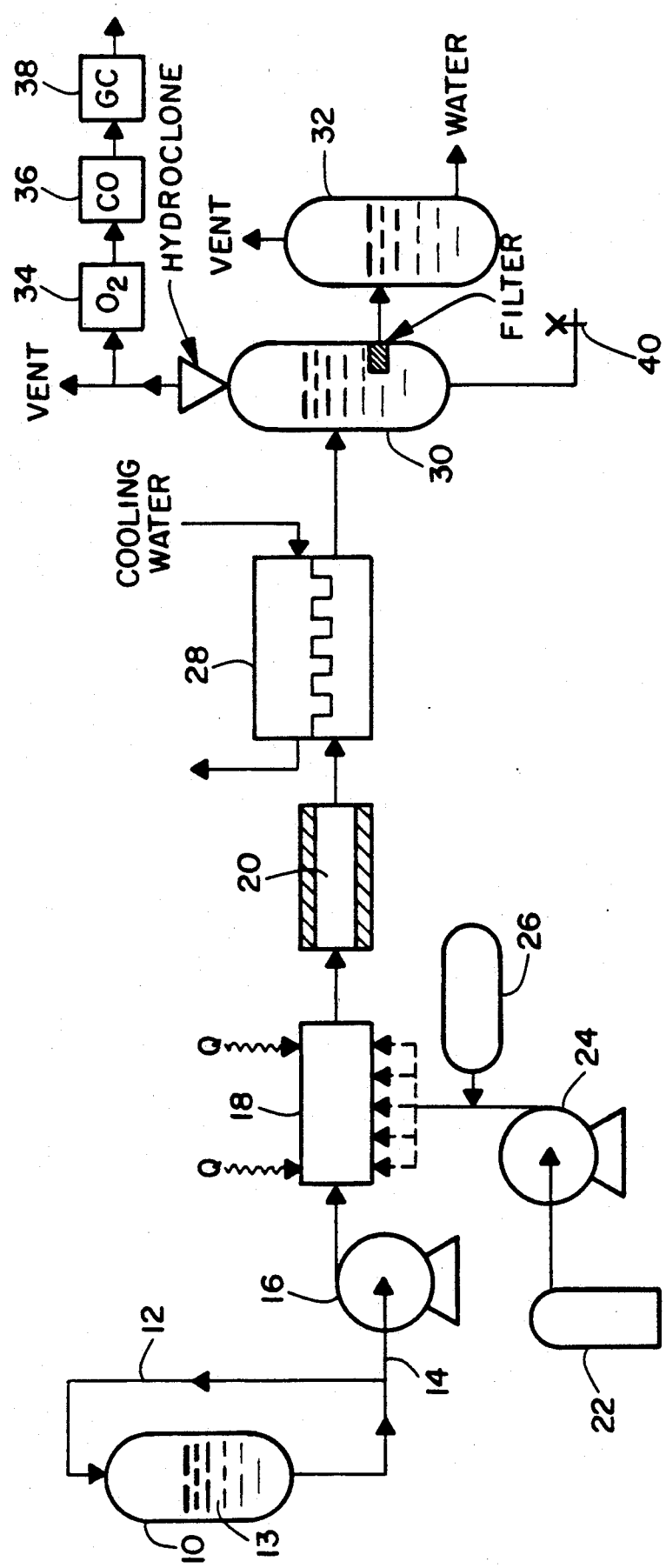
FIG. 2 illustrates representative equipment which can be used in the practice of the invention.

FIG. 2 shows representative apparatus for practicing the invention in a flow-through mode. It should be noted that apparatus other than that shown in FIG. 2 can be used to practice the invention. In particular, the literature references and patent publications discussed above disclose various equipment configurations which can be used in processes employing supercritical fluids. The use of such equipment with the present invention will be evident to persons of ordinary skill in the art from the disclosure herein. It should also be noted that the invention can be practiced in a batch mode, rather than a flow-through mode.

In the system of FIG. 2, the paper mill sludge 13 which is to be treated is first fed into holding tank 10. The water content of the sludge can be adjusted either prior to or while the sludge is in this tank. Tank 10 is part of a low pressure recirculation loop 12 which serves to keep the solids in the sludge uniformly suspended.

The output of recirculation loop 12 is connected to high pressure pump 16 by feed line 14. In the example discussed below, the high pressure pump was of the piston-type and the sludge was pressurized to a pressure of 3750±25 psia. As shown in FIG. 2, the output of high pressure pump 16 is connected to heater 18, which heats the mixture to the reaction temperature. In the example, the reaction temperature was approximately 520° C.

Oxidant is added to the sludge as it flows through the heater 18. As shown in FIG. 2, cylinder 22, compressor 24, and accumulator 26 are used to provide the oxidant to the heater. In the example discussed below, oxygen was used as the oxidant, and the amount of oxygen provided was in substantial excess over the stoichiometric amount required for complete oxidation of the sludge. The presence of excess oxygen was confirmed in the example by the presence of oxygen in the exit gas stream as measured by an oxygen meter.

Oxidation of the sludge occurs in insulated (plug flow) reactor 20 under supercritical or near supercritical conditions. In the example, the pressure and temperature in the reactor were substantially above the critical values for pure water, i.e., they were substantially above 217 atmospheres and 374° C.

The flow rates through the reactor varied during the experimental runs of the example. The average residence time in the reactor was calculated to be approximately 20 seconds for Experiment A and approximately 40 seconds for Experiment B. These times were found to be sufficient for substantial oxidation of the sludge into pure water (suitable for releasing into rivers), harmless gases (e.g., $CO_2$), and a small amount of inorganic ash (suitable for landfill).

Reactor 20 is connected to countercurrent heat exchanger 28 which cools the reaction products to near ambient temperatures via cooling water. Thereafter, separation tank 30 separates out the gas ($CO_2$, $O_2$) and solids (ash) from the liquid (water), which is filtered to an effluent tank 32. In the example, the separated gas was periodically analyzed by $O_2$ meter 34, CO meter 36, and gas chromatograph unit 38. Also, ash solids were periodically removed from solids take-off port 40.

Without intending to limit it in any manner, the present invention will be further illustrated by the following example.

EXAMPLE

This example illustrates the destruction of PCDD's and PCDF's in a typical paper mill sludge by supercritical water oxidation.

The substrate selected was primary clarifier sludge obtained from a paper mill located at Coosa Pines, Alabama, and owned by Kimberly-Clark Corporation, Neenah, Wisconsin (hereinafter referred to as "Coosa Pines sludge"). This sludge may be considered to be representative of the sludge produced by a typical paper mill.

Two experiments were performed using the Coosa Pines sludge. In Experiment A, the sludge was used as obtained and had a consistency of 3.3% (percent solids). Prior to oxidation, the sludge was macerated until it was pumpable. Specifically, the sludge was macerated with coarse, medium, and fine heads for one hour each using an in-line KINEMATICA disperser/homogenizer.

In Experiment B, the Coosa Pines sludge was spiked with 2,3,7,8-TCDD prior to oxidation. This compound was chosen for spiking since it is representative of the PCDD and PCDF compounds. It was also selected because of its strong adherence to solid substrates, difficulty of removal by conventional techniques (e.g., simple heat treatments), and high reported level of toxicity to certain common animals used in laboratory studies.

In both Experiments A and B, the levels of 2,3,7,8-TCDD, 2,3,7,8-TCDF, and the total levels of TCDDs and TCDFs were determined before and after supercritical water oxidation. Gas chromatography and high resolution mass spectrometry were used to determine these levels, and five replicate analyses were performed for each data point. The difference between the before and after levels was used to calculate a "destruction efficiency" value ("DE" value) for the process, defined as:

$$DE = (Amt. In - Amt. Out)/(Amt. In) \times 100\%$$

The spiking in Experiment B was performed as follows. One microgram of 2,3,7,8-TCDD, dissolved in one milliliter of acetone, was slowly added to a five-gallon container which contained the sludge sample, while stirring the sludge vigorously with an electric stirrer. Stirring was continued for about 15 minutes after the "spike" was added to insure homogeneity. Using the analysis techniques described above, the spiked mixture was found to contain 1600 ppt 2,3,7,8-TCDD on a solids basis. Prior to oxidation, the spiked sample was macerated with coarse, medium and fine heads for one hour each using the in-line KINEMATICA disperser/homogenizer. The sample was then diluted with water to a consistency of 1.65% (percent solids) and macerated for an additional hour with a fine head.

The oxidation of the spiked and unspiked samples was performed using the apparatus and experimental conditions discussed above. A summary of those conditions is set forth in Table 1.

As discussed above, the sludge feed flowrates used in the experiments varied with time. Accordingly, an average feed flowrate $\overline{Q}$ was calculated. The determination of $\overline{Q}$ for Experiments A and B is illustrated in FIGS. 3 and 4, respectively.

Figure 3:
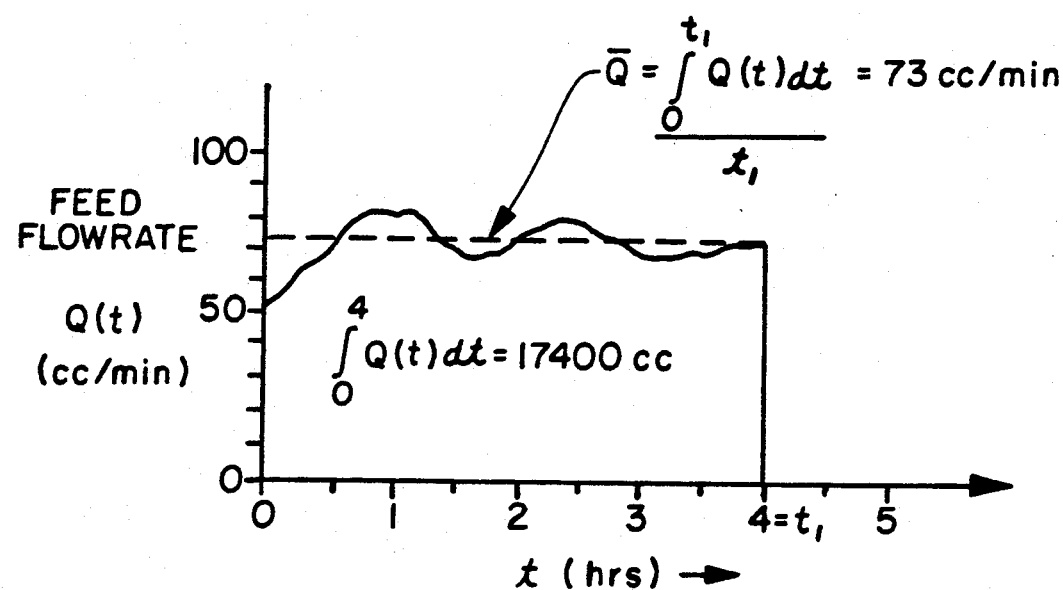
FIGS. 3 and 4 show the feed flow rates and solids collection points for Experiments A and B of the example discussed below.
Figure 3:
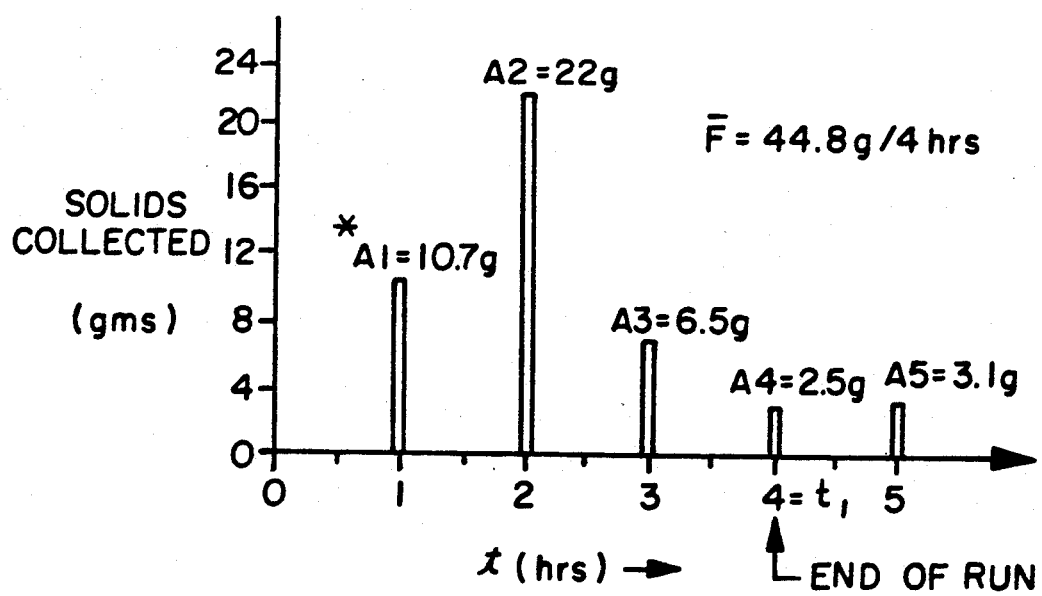
Figure 4:
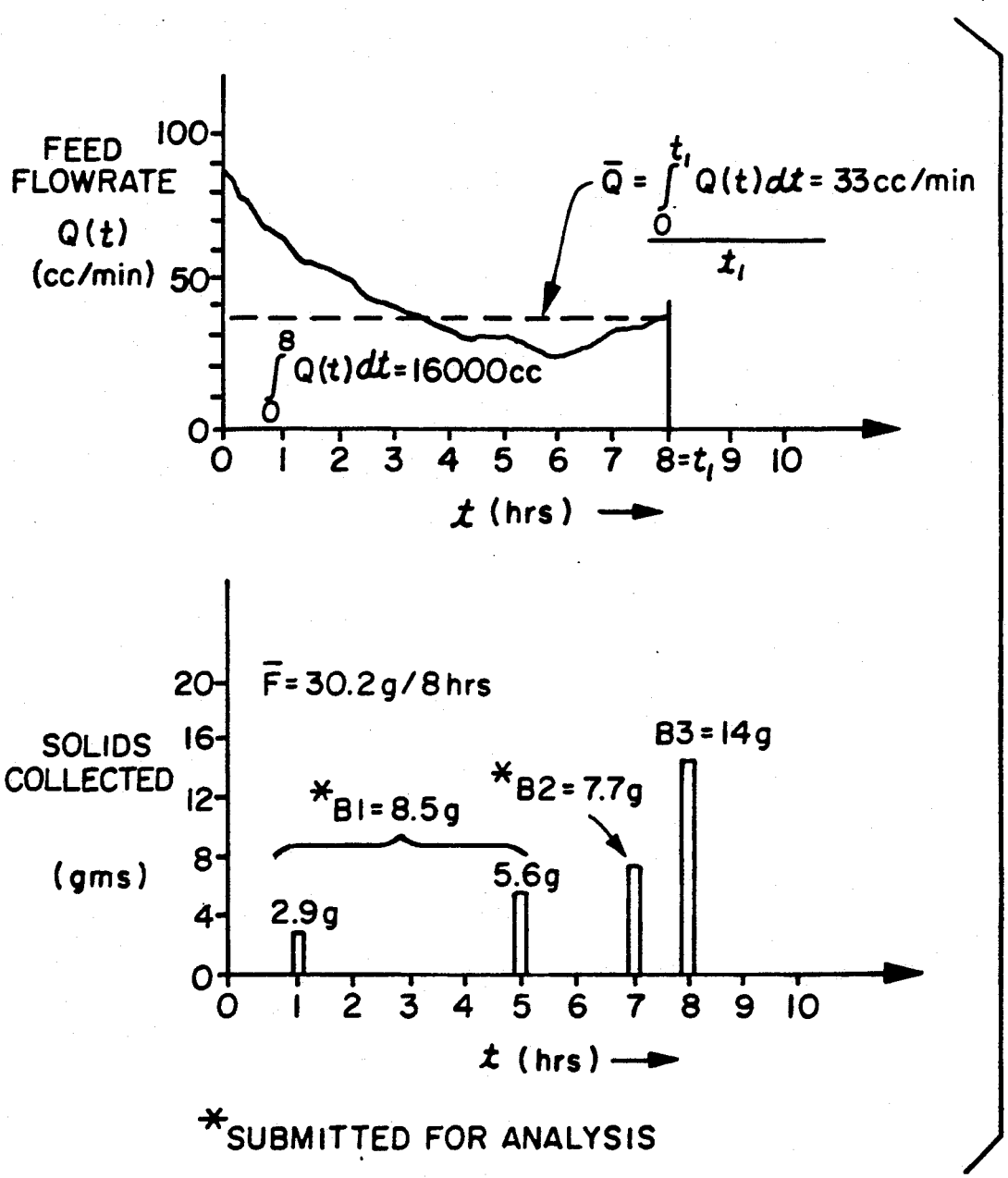

Similarly, the ash resulting from the oxidation was collected every hour to several hours (see FIGS. 3 and 4). Accordingly, an average solid flowrate $\overline{F}$ analogous to the average feed flowrate $\overline{Q}$ was calculated as follows:

$$\overline{F} = \Sigma \text{ solids collected}/t_1$$

where $t_1$ is the time duration of the experiment.

The values of $\overline{Q}$ and $\overline{F}$ for Experiments A and B, as well as the total feed and ash flows, are set forth in Table 1.

The ash samples used to determine the post-oxidation contamination levels are shown in FIGS. 3 and 4. Specifically, as shown in FIG. 3, the 10.7 gram sample of ash collected after the first hour of Experiment A was labeled "A1" and was submitted for analysis. In Experiment B, the 2.9 gram sample collected during the first hour was combined with the 5.6 gram sample collected at the fifth hour and was labeled "B1" and submitted for analysis. These samples were combined to provide a large enough sample size for the experimental assay. A second sample, "B2", taken at the seventh hour, was also submitted for analysis.

A summary of the results of the analysis of these samples is set forth in Table 2. Using this data, the destruction efficiency (DE) values of Table 3 were determined. The following discussion shows how the DE value for 2,3,7,8-TCDD for the A1 sample was calculated. The other DE values in Table 3 were calculated in the same manner.

As indicated in Table 1, the total feed for Experiment A was 17.4 liters and the percent solids was 3.3%. Accordingly, the total weight of the solid portion of the feed stock was 17.4×0.033=574 grams. From Table 2, the measured concentration of 2,3,7,8-TCDD in the feed stock was 60 ppt. Accordingly, the total amount of 2,3,7,8-TCDD in the feed stock was 574 grams solids×60×10$^{-12}$ grams TCDD per grams solids =3.444×10$^{-8}$ grams TCDD.

As indicated in Table 1, the total ash produced in Experiment A was 44.8 grams. From Table 2, the measured concentration of 2,3,7,8-TCDD for the A1 sample was 12 ppt. Using a similar concentration for all of the ash generated by this experiment, the total amount of 2,3,7,8-TCDD in the ash is 44.8 grams solid ash×12×10$^{-12}$ grams TCDD per gram solid ash =5.376×10$^{-10}$ grams TCDD.

The destruction efficiency then becomes:

$$DE = 100\% \times (3.444 \times 10^{-8} - 5.376 \times 10^{-10}) / (3.444 \times 10^{-8})$$

$$DE = 98.4\%$$

The foregoing data analysis procedure is summarized in Table 4.

From the data of Table 3, it is evident that the supercritical water oxidation was able to destroy over 98% of the 2,3,7,8-TCDD in Experiment A (unspiked feed), and over 99% of the 2,3,7,8-TCDD in Experiment B (spiked feed). Similar destruction efficiencies were achieved for TCDFs. These results clearly demonstrate that supercritical water oxidation is an effective method for destroying PCDD's and PCDF's in paper mill sludge.

TABLE 1
EXPERIMENTAL CONDITIONS

| | Experiment A | Experiment B |
|---|---|---|
| Feed Material | Coosa Pines primary clarifier sludge, unspiked, 3.3% solids | Coosa Pines primary clarifier sludge, spiked with 1600 ppt 2,3,7,8-TCDD (solids basis), diluted half and half with water to a 1.65% solids level |
| Reactor Temperature | 520° C. | 520° C. |
| Reactor Pressure | 3750 psia ± 25 | 3750 psia ± 25 |
| Total feed | 17.4 L | 16.0 L |
| Avg. Feed Flowrate, Q Total | 73 cc/min | 33 cc/min |
| Solids (Ash) | 44.8 gm | 30.2 gm |
| Avg. Solid Flowrate, F | 11.2 gm/hour | 3.8 gm/hour |

TABLE 2
TCDD AND TCDF CONCENTRATIONS

| | Experiment A | | Experiment B | | |
|---|---|---|---|---|---|
| | Feed Sludge | Product Ash A1 | Feed Sludge | Product Ash B1 | Product Ash B2 |
| 2,3,7,8 TCDD (ppt) | 60 | 12 | 1600 | 3.5 | 9.8 |
| Total TCDDs (ppt) | 74 | 108 | 1600 | 64 | 51 |
| 2,3,7,8 TCDFs (ppt) | <199* | 62 | <183* | 24 | 18 |
| Total TCDFs (ppt) | 572 | 659 | 465 | 298 | 212 |

*maximum concentration

TABLE 3
DESTRUCTION EFFICIENCIES (%)

| | Sample | | |
|---|---|---|---|
| | A1 | B1 | B2 |
| 2,3,7,8-TCDD | 98.4% | 99.97% | 99.9% |
| Total TCDDs | 88.6% | 99.5% | 99.6% |
| 2,3,7,8-TCDF | 97.6% | 98.4% | 98.8% |
| Total TCDFs | 91.0% | 92.0% | 94.3% |

TABLE 4

| Feed Sludge | |
|---|---|
| Amount | 17400 g (3.3% solids) |
| Total solids in feed sludge | 574 g |
| Concentration of 2,3,7,8-TCDD in feed sludge solids | 60 ppt (60 × 10$^{-12}$ g/g) |
| Total amount of 2,3,7,8-TCDD in feed sludge | 60 × 10$^{-12}$ g/g × 574 g = 3.444 × 10$^{-8}$ g |
| Ash (product after supercritical water oxidation) | |
| Total amount of ash produced | 44.8 g |
| Concentration of 2,3,7,8-TCDD in ash | 12 ppt (12 × 10$^{-12}$ g/g) |
| Total amount of 2,3,7,8-TCDD in ash | (12 × 10$^{-12}$ g/g) × 44.8 g = 5.376 × 10$^{-10}$ g |

$$\% \text{ destruction efficiency} = \frac{3.444 \times 10^{-8} \text{ g} - 5.376 \times 10^{-10} \text{ g}}{3.444 \times 10^{-8} \text{ g}} \times 100\%$$

$$= 98.4\%$$

What is claimed is:

1. A method for oxidizing polychlorinated dibenzo-p-dioxins and/or polychlorinated dibenzofurans in a waste product which contains water and cellulose fibers and which may contain clay and/or fillers comprising steps of:
   (a) combining the water-containing waste product with an oxidant; and
   (b) subjecting the combination of the water-containing waste product and the oxidant to supercritical or near supercritical conditions at a temperature in the range of from about 374° C. to about 750° C. for a period of time sufficient to oxidize at least about 90 percent of the polychlorinated dibenzo-p-dioxins and/or polychlorinated dibenzofurans in the waste product.

2. The method of claim 1 wherein prior to step (a) the water content of the waste product is adjusted so as to be in the range of from about 80 to about 99 percent by weight.

3. The method of claim 1 wherein prior to step (a), the water-containing waste product is macerated until it reaches a pumpable consistency.

4. The method of claim 1 wherein the amount of oxidant combined with the water-containing waste product exceeds the stoichiometric amount required for complete oxidation of the waste product.

5. The method of claim 1 wherein the oxidant is oxygen.

6. The method of claim 1 wherein at least about 95 percent of the polychlorinated dibenzo-p-dioxins and/or polychlorinated dibenzofurans in the waste product are oxidized.

7. The method of claim 1 wherein step (b) is performed at a pressure above about 217 atmospheres.

8. The method of claim 7 wherein the pressure is less than about 500 atmospheres.

9. The method of claim 8 wherein the pressure is between about 250 atmospheres and about 410 atmospheres and wherein the temperature is between about 400° C. and about 650° C.

10. The method of claim 1 wherein the combination of the water-containing waste product and the oxidant is subjected to supercritical or near supercritical conditions for a period of at least 1 second.

11. The method of claim 10 wherein the combination of the water-containing waste product and the oxidant is subjected to supercritical or near supercritical conditions for a period of at least 5 seconds.

12. The method of claim 1 wherein the waste product is paper mill sludge.

13. The method of claim 1 wherein the polychlorinated dibenzo-p-dioxins and/or polychlorinated dibenzofurans are selected from the group consisting of 2,3,7,8-tetrachlorodibenzo-p-dioxin, 1,2,3,7,8-pentachlorodibenzo-p-dioxin, 2,3,7,8-tetrachlorodibenzofuran, 1,2,3,7,8-pentachlorodibenzofuran, 2,3,4,7,8-pentachlorodibenzofuran, 1,2,3,6,7,8-hexachlorodibenzo-p-dioxin, 1,2,3,7,8,9-hexachlorodibenzo-p-dioxin, 1,2,3,4,7,8-hexachlorodibenzo-p-dioxin, 1,2,3,6,7,8-hexachlorodibenzofuran, 1,2,3,7,8,9-hexachlorodibenzofuran, 1,2,3,4,7,8-hexachlorodibenzofuran, 2,3,4,6,7,8-hexachlorodibenzofuran, and mixtures thereof.

14. The method of claim 1 wherein the polychlorinated dibenzo-p-dioxins and/or polychlorinated dibenzofurans are selected from the group consisting of 2,3,7,8-tetrachlorodibenzo-p-dioxin, 1,2,3,7,8-pentachlorodibenzo-p-dioxin, 2,3,7,8-tetrachlorodibenzofuran, 1,2,3,7,8-pentachlorodibenzofuran, 2,3,4,7,8-pentachlorodibenzofuran, and mixtures thereof.

* * * * *